(12) United States Patent
Nakamura et al.

(10) Patent No.: US 11,185,954 B2
(45) Date of Patent: Nov. 30, 2021

(54) TRANSPORT SYSTEM, TRANSPORT METHOD, AND ARTICLE MANUFACTURING METHOD

(71) Applicant: CANON KABUSHIKI KAISHA, Tokyo (JP)

(72) Inventors: Takashi Nakamura, Tokyo (JP); Hidetada Narahara, Kawasaki (JP); Shinichiro Takahama, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 16/201,753

(22) Filed: Nov. 27, 2018

(65) Prior Publication Data
US 2019/0160609 A1 May 30, 2019

(30) Foreign Application Priority Data

Nov. 30, 2017 (JP) .............................. JP2017-230997
Nov. 2, 2018 (JP) .............................. JP2018-207506

(51) Int. Cl.
| | | |
|---|---|---|
| *G06F 7/00* | (2006.01) | |
| *B23P 21/00* | (2006.01) | |
| *B23P 19/04* | (2006.01) | |
| *B65G 37/02* | (2006.01) | |

(52) U.S. Cl.
CPC ............. *B23P 21/004* (2013.01); *B23P 19/04* (2013.01); *B65G 37/02* (2013.01)

(58) Field of Classification Search
CPC ........ B23P 21/004; B23P 19/04; B65G 37/02; B65G 2203/0283; B65G 54/02
USPC ................. 700/213–215, 217–218, 228, 230
See application file for complete search history.

(56) References Cited

U.S. PATENT DOCUMENTS

| | | | |
|---|---|---|---|
| 6,240,335 B1 | 5/2001 | Wehrung | |
| 2011/0165531 A1* | 7/2011 | Matsuura | F27B 9/2407 432/239 |
| 2013/0282168 A1* | 10/2013 | Yokota | B65G 43/00 700/230 |
| 2013/0282223 A1* | 10/2013 | Yokota | B62D 65/18 701/23 |
| 2014/0353117 A1* | 12/2014 | Gotou | H01L 21/67706 198/370.01 |

FOREIGN PATENT DOCUMENTS

| | | |
|---|---|---|
| CN | 101268609 A | 9/2008 |
| CN | 102235883 A | 11/2011 |
| CN | 103370668 A | 10/2013 |
| CN | 106170422 A | 11/2016 |
| CN | 106612095 A | 5/2017 |
| JP | 63-148803 A | 6/1988 |
| JP | 3249620 A | 1/2002 |
| JP | 2008-161019 A | 7/2008 |
| JP | 2014-003211 A | 1/2014 |
| JP | 2015202793 A | 11/2015 |

* cited by examiner

*Primary Examiner* — Yolanda R Cumbess
(74) *Attorney, Agent, or Firm* — Canon U.S.A., Inc. I.P. Division (57) ABSTRACT

A transport system includes a transport path having at least two transporting modules, a carriage configured to move on the transport path, a controller provided on each of the two transporting modules and configured to drive the carriage in response to a drive command, and a sensor provided on each of the two transporting modules. The drive command is corrected with a distance between the sensors provided on the two transporting modules.

17 Claims, 6 Drawing Sheets

FIG. 6

TRANSPORT SYSTEM, TRANSPORT METHOD, AND ARTICLE MANUFACTURING METHOD

BACKGROUND OF THE INVENTION

Field of the Invention

The present disclosure relates to transporting of a carriage and particularly to a transport system applying a moving magnet type linear motor (or MM type linear motor) technology.

Description of the Related Art

Generally, in a factory-automated manufacturing scene for assembling industrial products, a transport system is applied which transports parts between a plurality of stations.

In recent years, a transport system with enhanced production efficiency has been frequently used which divides a transport path into a plurality of control zones, provides a controller in each of the control zones, and causes a carriage to travel across the control zones.

Such a transport system generally includes a plurality of lower-level controllers each configured to control a control zone and an upper-level controller connected to the plurality of lower-level controllers via a communication system.

In a transport system disclosed in Japanese Patent Laid-Open No. 2015-202793, a drive command generated by the upper-level controller is transmitted to the lower-level controller in advance, and transport commands are transmitted from the upper-level controller to the lower-level controller simultaneously to execute the drive commands transmitted to the lower-level controller.

Japanese Patent Laid-Open No. 2015-202793 disadvantageously changes the velocity of the carriage, which makes vibrates the carriage, in a case where an interval between transporting modules is changed from a predetermined value and the carriage passes through the boundary between two transporting modules. Furthermore, a carriage may stop at a position across a boundary of two transporting module without satisfying the precision of a desired stop position or may not completely stop there within a desired time period of time.

The present disclosure was made in view of the aforementioned disadvantages and can provide a transport unit which can transport a carriage with high precision.

SUMMARY OF THE INVENTION

A transport system according to an aspect of the present disclosure includes a transport path having at least two transporting modules, a carriage configured to move on the transport path, a controller provided on each of the two transporting modules and configured to drive the carriage in response to a drive command, and a sensor provided on each of the two transporting modules. The drive command is corrected with a distance between the sensors provided on the two transporting modules.

A transport method for a carriage according to another aspect of the present disclosure includes moving the carriage along a first transporting module in response to a first drive command, moving the carriage across the first transporting module and a second transporting module in response to the first drive command and a second drive command, moving the carriage along the second transporting module in response to the second drive command. The second drive command is corrected with a distance between a first sensor provided on the first transporting module and a second sensor provided on the second transporting module.

An article manufacturing method using the transport system and at least one processing device according to another aspect of the present disclosure includes transport the carriage by the transport system to the processing device, and manufacturing an article by performing a predetermined process on a work piece on the carriage by the processing device.

Further features of the present invention will become apparent from the following description of exemplary embodiments with reference to the attached drawings.

DESCRIPTION OF THE EMBODIMENTS

First Embodiment

Figure 1:
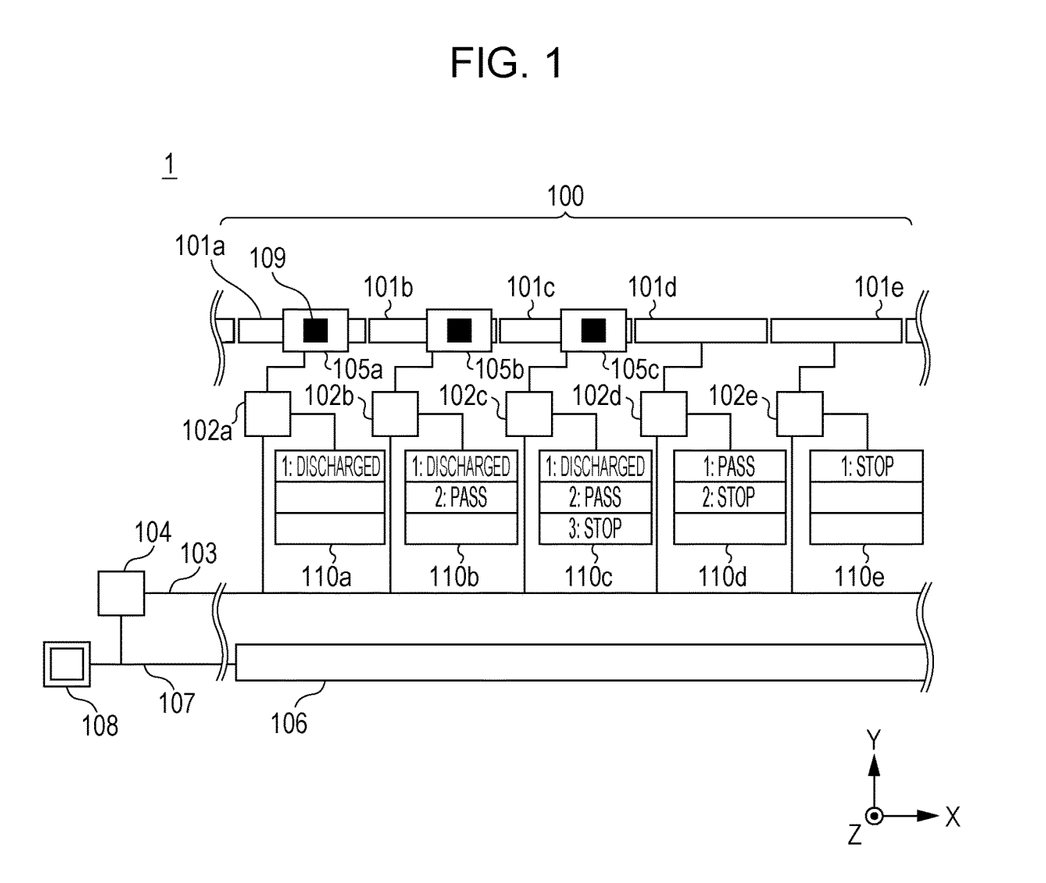
FIG. 1 is a schematic configuration diagram illustrating a transporting control system according to a first embodiment.

FIG. 1 is a schematic diagram of a part of a carriage transport system including a transport path, carriages, lower-level controllers (controller or first controllers), and an upper-level controller (second controller). FIGS. 1 to 3A to 3C have an X axis along a direction of transporting of a carriage, a Z axis perpendicular to a platform on which transporting modules is to be set, and a Y axis orthogonal to the X axis and Z axis. The coordinate system herein will sometimes be called a global coordinate system.

The carriage transport system 1 has a transport path 100 including a plurality of transporting modules 101 and a plurality of lower-level controllers 102. The plurality of transporting modules 101 are connected with each other on the platform. The plurality of lower-level controllers 102 are connected with a plurality of transporting modules 101 in a one-to-one correspondence manner and are configured to control the respective connected transporting modules 101. The carriage transport system 1 further includes an upper-level controller 104 and a plurality of carriages 105. The upper-level controller 104 is configured to control the plurality of lower-level controllers 102 over a network 103. The carriages 105 are configured to transport work pieces 109 on the transport path 100.

The plurality of lower-level controllers 102 are communicably connected with the upper-level controller 104 over the network 103, and each of the lower-level controllers 102 has a memory 110 configured to store a drive command transmitted from the upper-level controller 104. Each of the lower-level controllers 102 is responsible for control over the connected transporting module 101 and performs a driving control on the carriages 105 on the responsible transporting module 101 or in order of entry thereto based on the drive command stored in the memory 110.

The carriage transport system 1 is used together with a processing device group 106 including a plurality of processing devices. When the plurality of carriages 105 receives motive power from the transporting modules 101, the carriages 105 move along the transport path 100 and transport an object (work piece) 109 to be processed to the processing devices. Here, the processing devices in the processing device group 106 are connected with each other over a processing device network 107 and are controlled by a process control unit 108. The process control unit 108 is connected and exchanges information with the upper-level controller 104.

FIG. 1 illustrates the transport path 100 that is a part of an entire transport path, and, for simple description, illustrates five transporting modules 101a to 101e, lower-level controllers 102a to 102e, and three carriages 105a to 105c in an extraction manner. The numbers of transporting modules, lower-level controllers and carriages are not limited thereto.

A drive command to control by each of the lower-level controllers 102 the carriage 105 that enters to the transporting module 101 is stored in association with the order of entry in the memory 110 in the lower-level controller 102, details of which will be described below. For example, assume that referring to FIG. 1, a carriage 105c first stops on the transporting module 101c, a carriage 105b then passes on the transporting module 101c, and the carriage 105a then passes on the transporting module 101c. Also assume that the memory 110c in the lower-level controller 102c sequentially stores drive commands "1:discharge", "2:pass", and "3:stop". The lower-level controller 102c applies the drive command "1:discharge" to the carriage 105c on the transporting module 101c and discharges the carriage 105c. The drive command "2:pass" is applied to the carriage 105b that enters to the transporting module 101c next and causes the carriage 105b to pass through. The lower-level controller 102c then applies the drive command "3:stop" to the carriage 105c that enters to the transporting module 101c next and causes the carriage 105c to stop.

Figure 2A:
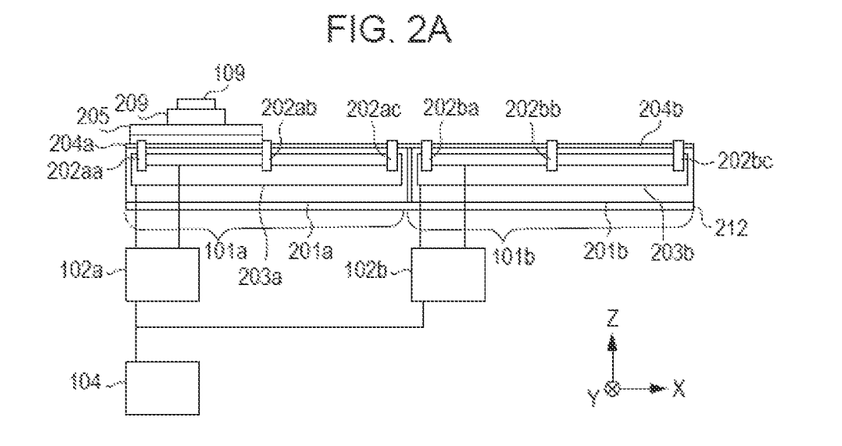
FIGS. 2A, 2B, and 2C are schematic configuration diagrams illustrating configurations of transporting modules and a carriage according to the first embodiment.
Figure 2B:
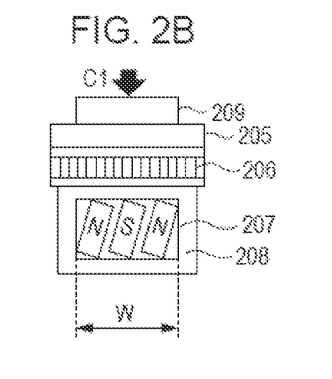
Figure 2C:
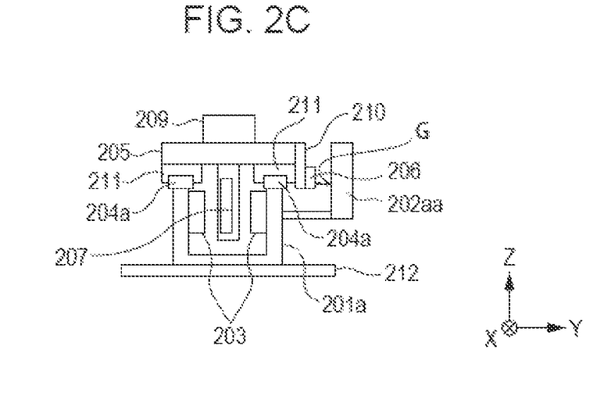

FIGS. 2A, 2B, and 2C illustrate two transporting modules 101a, 101b and one carriage 105, details of which will be described below.

FIG. 2A illustrates the carriage 105 and the transporting modules 101a and 101b viewed from the Y axis direction, and FIG. 2B illustrates the carriage 105 viewed from the Y axis direction. FIG. 2C illustrates the transporting module 101a and the carriage 105 viewed from the X axis direction.

As illustrated in FIGS. 2A and 2C, the transporting module 101a set on the platform 212 includes a module case 201a, encoders 202aa to 202ac, a coil group 203a, and a guide rail 204a and is connected with a lower-level controller 102a. The transporting module 101b further includes a module case 201b, encoders 202ba to 202bc, a coil group 203b, and a guide rail 204b (not illustrated) and is connected with a lower-level controller 102b. The encoders 202aa to 202bc are used, for example, according to this embodiment, but embodiments are not limited thereto. In a case where a position of the carriage 105 can be detected, a publicly known sensor can be used. The encoders 202aa to 202bc will sometimes be called sensors 202aa to 202bc. A power supply which is not illustrated is connected with the lower-level controllers 102a. The number and attached positions of the sensors 202aa to 202ac on the transporting module 101a can be adjusted in accordance with the sizes of the carriage 105 and the transporting module 101a and the precision of the detection of the position of the carriage 105. The configuration is also true in the other transporting modules 101. More specifically, the sensors are attached such that the interval between arbitrary adjacent sensors is shorter than the length of a scale 206 all over the entire transport path 100.

Referring to FIGS. 2B and 2C, the carriage 105 includes a top 205, a scale 206, a plurality of permanent magnets 207 (which will sometimes called a magnet array), a permanent magnet bracket 208, a work piece hold mechanism 209, a scale bracket 210, and a guide block 211.

The permanent magnet bracket 208, the work piece hold mechanism 209, the scale bracket 210 and the guide block 211 are attached to the top 205, and the plurality of permanent magnets 207 is attached to one or both sides of the permanent magnet bracket 208. The scale 206 is attached to a scale bracket 210, and the work piece hold mechanism 209 holds the work piece 109 on the top 205.

The guide block 211 for the carriage 105 is guided to the guide rail 204 of the transporting module 101, and the carriage 105 is driven by an electromagnetic force generated between the carriage 105 and the coil group 203 attached to the module case 201 to be transported along the transport path 100 (X axis).

For example, the sensors 202aa to 202ac in the transporting module 101a are attached to a plurality of positions of the module case 201a such that a constant gap (G) can be kept between the sensors 202aa to 202ac and the scale 206 of the carriage 105. The sensors 202aa to 202ac are attached at proper intervals that enable the sensors 202aa to 202ac to detect the carriage 105 at any position in the transporting module 101a.

The sensors 202aa to 202ac read out a pattern of the scale 206 in the carriage 105 and detect a position (X position) in the X direction of the carriage 105 as a relative position from the sensors 202aa to 202ac. The sensors 202aa to 202ac then output information regarding the position of the carriage 105a to the lower-level controllers 102a, and the lower-level controllers 102a can locate the carriage 105 on the responsible transporting modules 101a based on the information. It should be noted that the lower-level controllers 102a may transmit the information to the upper-level controller 104.

According to this embodiment, the sensors 202aa to 202bc are of an absolute type, and the scale 206 can be read out by the sensors of the absolute type is mounted. However, embodiments of the present disclosure are not limited thereto.

FIG. 2B illustrates a driving width W that is a width in the direction of transporting (X direction) of the magnet array 207.

The carriage 105 is transported about a center C1 or a reference position C1 of the width in the direction of transporting (X direction) of the carriage, for example, and the position of the carriage 105 is defined as coordinates of the reference position C1.

The upper-level controller 104 controls the entire transporting system by using one coordinate system (the aforementioned global coordinate system) for controlling the carriage 105.

On the other hand, the lower-level controllers 102a to 102e control by using individually set coordinate systems (local coordinate systems).

Among sensors provided in each of the transporting modules configured to transmit a signal to respectively corresponding lower-level controllers, the leftmost positions of the sensors 202aa and 202ba may be defined as an origin of the local coordinate systems of the corresponding transporting modules.

The upper-level controller 104 may keep the leftmost positions (designed values) of sensors of the transporting module at the origin position of the corresponding local coordinate systems, for example.

The lower-level controllers 102 applies electric current to the coil group 203 in the corresponding transporting modules 101 to control their amount of current based on drive commands stored in the memories 110 in the lower-level controllers 102. Thus, the lower-level controllers 102 transport the carriage 105 on the corresponding transporting modules 101 to predetermined positions at a predetermined velocity or stop it.

The lower-level controllers 102 can detect by using the sensors 202aa to 202bc in the corresponding transporting modules 101 that the carriage 105 enters from the adjacent transporting module 101 to the corresponding transporting modules 101. From the time when the entering carriage 105 reaches predetermined positions in the corresponding transporting modules 101, the lower-level controllers 102 control transporting of the carriages 105a to 105e based on control commands within the memories 110a to 110e. Each of the predetermined positions may be located at a boundary between the transporting modules 101. The lower-level controller 102 may control a carriage 105 when the sensor 202 of the corresponding transporting module 101 reads out the scale 206 of the carriage 105.

For example, assume that the carriage 105 moves from left to right in FIG. 2A and that the lower-level controller 102a controls the carriage 105 on the transporting module 101a when the sensor 202aa in the transporting module 101a reads out the scale 206 of the carriage 105. Also, when the carriage 105 enters to the transporting module 101b and the sensor 202ba in the transporting module 101b reads out the scale 206 of the carriage 105, the lower-level controller 102b controls the carriage 105 on the transporting module 101b.

Next, a "group transport command" will be described. A group transport command is drive commands to be simultaneously transmitted from the upper-level controller 104 to all or a group of the plurality of lower-level controllers 102 configured to control all or a part of carriages a carriage group including a plurality of carriage 105. In other words, the group transport commands are signals to simultaneously start operations (or controls to drive the corresponding carriages) of the plurality of lower-level controllers 102 having received the commands.

The plurality of lower-level controllers 102 in response to the group transport commands from the upper-level controller 104 applies drive commands stored in their memory 110 sequentially to the carriage 105 on the corresponding transporting module 101 or the carriage 105 just entering to the transporting module 101 and starts driving control over the carriage 105.

Figures 3A, 3B, 3C:
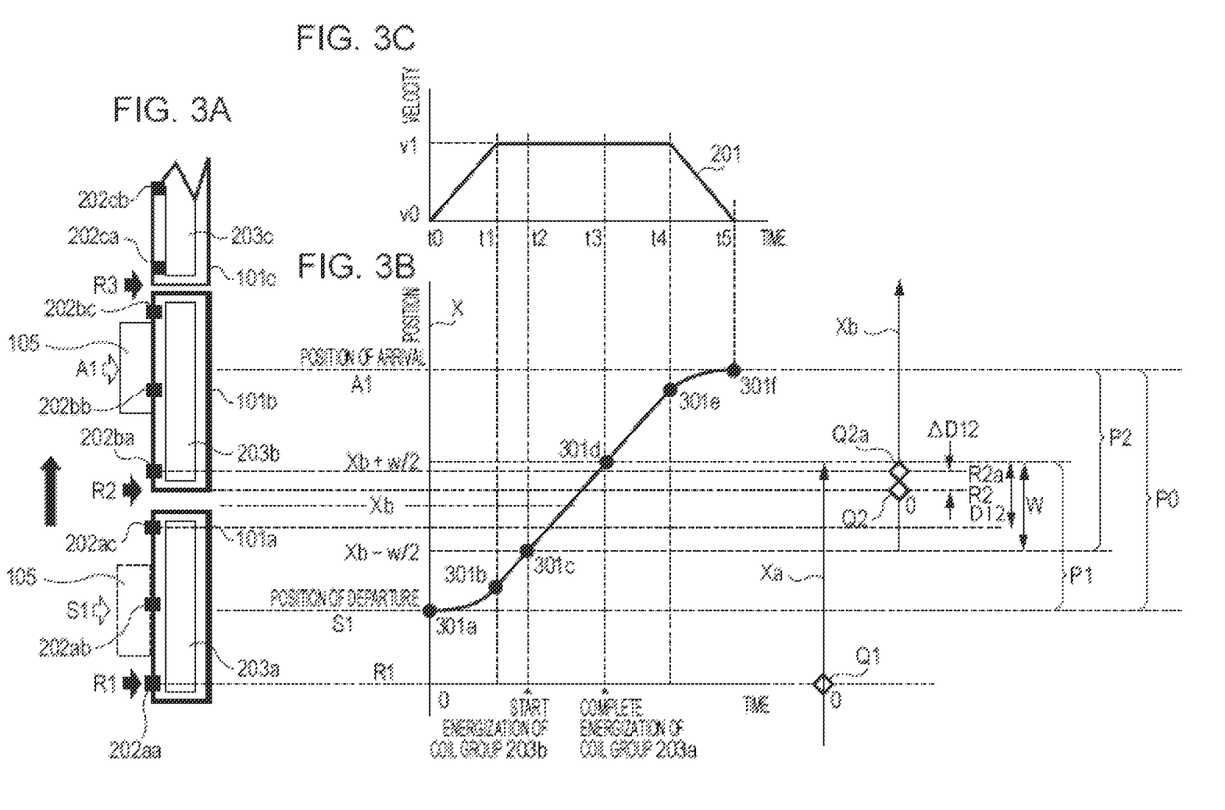
FIGS. 3A, 3B, and 3C are transporting profiles of one carriage according to the first embodiment.

Next, with reference to FIGS. 3A, 3B, and 3C, a method will be described which transports one carriage 105 between a plurality of transporting modules 101. FIG. 3A is a schematic configuration diagram illustrating that one carriage 105 is transported across two transporting modules 101a and 101b. FIG. 3B is a transporting profile of the carriage 105 having a horizontal axis having the carriage 105 at an X position and a vertical axis indicating time period t. FIG. 3C is a velocity profile of the carriage 105 having a horizontal axis indicating velocity v of the carriage 105 and a vertical axis indicating time period t.

A transporting profile P0 is a driving profile for causing the carriage 105 to move from a start position SI to an arrival position A1 with a trapezoid driving 201 at a maximum velocity v1 in a required time period t 5, and the coordinate values are defined on a global coordinate system X.

The upper-level controller 104 generate the transporting profile P0 and extracts partial profiles (drive commands) P1 and P2 therefrom.

Because, in this configuration, the control over the transporting of the carriage 105 involves the lower-level controllers 102a to 102b connected to the two transporting modules 101a to 101b, the partial profile (drive command) P1 is transmitted to the lower-level controller 102a. The partial profile P2 is transmitted to the lower-level controller 102b. Thus, the memory 110a in the lower-level controller 102a prestores a drive command "1:discharge" that is the partial profile P1. The memory 110b in the lower-level controller 102b prestores a drive command "1:stop" that is the partial profile P2.

The carriage 105 first stops on the transporting module 101a, and the lower-level controllers 102a and 102b start control over transporting of the carriage 105 in response to a group transport command from the upper-level controller 104.

The lower-level controller 102a applies the drive command "1:discharge" stored in the memory 110a to the carriage 105 to transport the carriage 105 toward the adjacent transporting module 101b. In this point in time, the lower-level controller 102b has received the group transport command, but the carriage 105 has not entered onto the corresponding transporting module 101b. Therefore, the operation is not occurring.

After that, when the carriage 105 comes to the boundary between the transporting modules 101a and 101b or when the sensor 202ba in the transporting module 101b reads the scale 206 of the carriage 105, the control over the carriage 105 is shifted from the lower-level controller 102a to the lower-level controller 102b.

After that, the lower-level controller 102b applies the drive command "1:stop" stored in the memory 110b to the carriage 105 to cause the carriage 105 to stop at a predetermined position. In this manner, the carriage 105 can be transported across the transporting module 101a to 101b.

Next, a transporting profile 301 relating to one carriage 105 will be described. The transporting profile 301 is a profile relating to a driving control by one or more lower-level controllers 102a to 102b from the stop state of the carriage 105 through start of a moving state back to the stop state.

FIG. 3B exemplarily illustrates a transporting profile P0 relating to one carriage 105.

A value R1 (designed value) indicating an expected position of the sensor 202aa on a global coordinate system is held in the upper-level controller. Actual position of the sensor 202aa is the origin of the transporting module 101a.

A value R2 (designed value) indicating an expected position of the sensor 202ba on a global coordinate system is held in the upper-level controller. The expected position (designed value) of the sensor 202ba is the origin of the transporting module 101b.

FIG. 3B further illustrates origins Q1 and Q2 of the transporting module 101a and 101 b on the local coordinate system.

The origins on the local coordinate system are driving start points in time of the carriage 105 and are positioned at the sensors 202aa, 202ba upstream of the transporting modules.

The origin Q1 on the local coordinate system is thus determined for the transporting module 101a, and the origin Q2 on the local coordinate system is determined for the transporting module 101b.

Although, according to this embodiment, the origin on the local coordinate system of the upstream transporting module 101a is the origin on the global coordinate system, embodiments are not limited thereto.

Carriage's operations can be represented in forms of time against position, time against velocity, and position against velocity, which can be converted to each other. Therefore, any one of the forms may be used for representing the drive commands P1 and P2 that are partial profile, but position against velocity will be described according to this embodiment here.

The carriage 105 first stops on the transporting module 101a, is then transported to the transporting module 101b and then stops. Referring to FIG. 3B, the transporting profile P0 starts from a point 301a and completes at a point 301f.

The carriage 105 starts energization to the coil group 203a of the transporting module 101a at a time t0 when the carriage 105 stops. Thus, the carriage 105 starts moving at the velocity v0, reaches time t1 at a velocity v (>v0) and reaches the boundary between the two transporting modules 101a, 101b at a time t2.

When the carriage 105 starts energization to the coil group 203b in the transporting module 101b at the time t2 and enters to the transporting module 101b, the carriage 105 keeps the velocity v up to a time t4, then decelerates to a time t5 and stops at the velocity v0 on the transporting module 101b. During these operations, the energization to the coil group 203a in the transporting module 101a completes at a time t3.

Referring to FIG. 3B, points 301a to 301f are points on the transporting profile P0 at the times t0 to time t5, respectively.

Here, FIG. 3B illustrates a one common coordinate system (global coordinate system) X indicating positions of the transporting modules 101a to 101b. Individual coordinate systems (local coordinate systems) Xa and Xb are coordinate systems indicating positions within the transporting modules 101a, 101b. The carriage 105 has a velocity v.

Attributes X, Xa, Xb, and v are represented with corresponding points on the transporting profile P0 as their respective arguments. For example, "X(301a)" represents an X coordinate of the carriage 105 at the point 301a on the transporting profile 301, and "Xa(301a)" represents an Xa coordinate of the carriage 105 at the point 301a on the transporting profile 301. The carriage 105 may have a velocity "V(301a)" at the point 301a on the transporting profile 301.

Next, a trapezoid driving profile will be described. The "trapezoid driving profile" is one or more trapezoid driving elements representing driving control over the carriage 105 entering to the transporting module 101 and the carriage 105 within the transporting module 101.

Here, a "trapezoid driving element" is a transporting state of the carriage 105 represented by a combination of a start position, an end position, a start position velocity and an end position velocity. For simplified description, one trapezoid driving element is enclosed in parentheses as (start position, end position, start position velocity, end position velocity). Trapezoid driving elements arranged in time order relating to one carriage 105, which is enclosed in braces { } represent a trapezoid driving profile for the carriage 105.

When one group transport command is transmitted from the upper-level controller 104, one or more carriages 105 pass or stop on one transporting module 101. Accordingly, one or more trapezoid driving profiles enclosed in brackets [ ] for one transporting module 101 represents "module drive command" or simply "drive command" for the transporting module 101.

A drive command for each transporting module is transmitted from the upper-level controller 104 to the corresponding lower-level controller 102 and stored within the memory 110. After that, when the lower-level controller 102 receives a group transport command from the upper-level controller 104, a driving control over a carriage is performed based on the trapezoid driving profile involving the drive command stored in the memory.

For example, referring to FIG. 3B, a drive command P1 to be transmitted from the upper-level controller 104 to the lower-level controller 102a for the transporting module 101a before a group transport command is transmitted is expressed by the following Expression (1).

$$[\{(Xa(301a), Xa(301b), v0, v1), (Xa(301b), Xa(301c), v1, v1), (Xa(301c), Xa(301d), v1, v1)\}] \quad (1)$$

When the lower-level controller 102a receives the drive command P1, the drive command P1 is stored in the memory 110a.

Also, a drive command P2 to be transmitted to the lower-level controller 102b for the transporting module 101b is expressed by Expression (2).

$$[\{(Xb(301c), Xb(301d), v1, v1), (Xb(301d), Xb(301e), v1, v1), (Xb(301e), Xb(301f), v1, v0)\}] \quad (2)$$

When the lower-level controller 102b receives the drive command P2, the drive command P2 is stored in the memory 110b.

When the lower-level controllers 102a and 102b receive a group transport command from the upper-level controller 104, the transporting of the carriage 105 starts. The carriage 105 departs from the transporting module 101a and stops on the transporting module 101b.

Here, at points 301c and 301d on the transporting profile P0, for the transporting module 101a, drive commands represented by individual coordinate systems (local coordinate systems), Xa(301c), Xa(301d) of the transporting module 101a are transmitted to the lower-level controller 102a. For the transporting module 101b, drive commands represented by individual coordinate systems (local coordinate systems), Xb(301c), Xb(301d) of the transporting module 101b are transmitted to the lower-level controller 102b. In other words, between the points 301c and 301d on the transporting profile P0, the two transporting modules are driven based on position information represented by the local coordinate systems by the coils of both of the two transporting modules.

The carriage 105 is energized and controlled by both of the coil group 203a in the transporting module 101a and the coil group 203b in the transporting module 101b while the carriage 105 is at a position across the boundary of the transporting modules 101a and 101b or at a position represented by coordinates Xb−W/2 to Xb+W/2.

However, transporting modules, which connect transport paths including a plurality of transporting modules 101 connected with each other on a platform may be attached with distances therebetween (such as a distance between transporting modules 101a and 101b) deviated from a predetermined value. Deviation of the distance between the transporting module 101a and 101b from a designed value (predetermined value) displaces the position of the sensor on the transporting module 101b with respect to the sensor on the transporting module 101a (or the distance between the sensors) from a predetermined position. In other words, when a distance between adjacent transporting modules (distance between sensors thereon) is deviated from a predetermined value, two control units recognize different carriage positions based on position information particularly from the two sensor 202ac and 202ba closest to the boundary of the transporting modules 101a and 101b. This may result in conflict between electric current controls by the two lower-level controllers responsible for the two adjacent transporting modules, causing vibrations or detection of different carriage positions. In order to prevent the vibrations or detection of different carriage positions, the position in the partial profile (drive command) P2 is corrected.

This embodiment can prevent vibrations or detection of different carriage positions due to conflict of electric current controls by control units configured to control two adjacent transporting modules.

Next, how the partial profile (drive command) P2 is to be corrected will be described. Although the transporting modules 101a and 101b are exemplarily applied according to this embodiment, embodiments are not limited thereto.

First, after a plurality of transporting modules is connected with each other on a platform, a distance D12 between sensors in the plurality of transporting modules (such as a distance from the sensor 202ac to the 202ba) is measured in advance.

Although various measurement methods may be considered, the two sensors 202ac and 202ba closest to a boundary between the transporting modules 101a and 101b are used, for example. More specifically, the carriage 105 is stopped at a position across the transporting modules 101a and 101b. The lower-level controllers 102a and 102b use the respective sensors 202ac and 202ba to read out the scale 206 and acquire their respective position information pieces. The difference between the thus acquired two position information pieces is calculated so that the distance D12 between the sensors 202ac and 202ba can be measured. It should be noted that the measurement may be performed before a start of working of the transport system or at an arbitrary time while it is working. The carriage 105 may be stopped at the position. In a case where the scale 206 is of glass, an individual difference among scales can be substantially ignored. Thus, a value measured from one carriage can be applied to all carriages. In other words, when the measurement is performed from the carriage 105, the correction can be used for the next carriage that passes through the position next.

The distance D12 between the thus acquired transporting modules 101a and 101b may be stored in the upper-level controller in advance, and the value is used to correct upon extraction of the partial profile (drive command) P2 generated from the transporting profile in the upper-level controller 104.

More specifically, for example, in a case where the designed value for the distance is D0 between two sensors 202ac and 202ba with the boundary of adjacent transporting modules therebetween, the difference in distance from the designed value D0 between the sensors 202ac and 202ba can be acquired as $\Delta D2 = D12-D0$. It should be noted that the position of the sensor 202aa that is the origin of the transporting module 101a is a true position. $\Delta D12$ is higher than 0 (or a positive value) if D12 is higher than D0, and $\Delta D12$ is lower than 0 (or a negative value) if D12 is lower than D0.

More specifically, a true position R2a of the sensor 202ba on the global coordinate system can be acquired as $R2a=R2+\Delta D12$. If the true position of the sensor 202ba is known, the true origin Q2a on the local coordinate system Xb of the transporting module 101b can be defined at a position displaced from the original position Q2 by the distance $\Delta D12$.

The upper-level controller 104 uses the thus defined and corrected local coordinate system to extract and convert the partial profile (drive command) P2 to the local coordinate. This can correct the different carriage positions recognized by the two control units.

More specifically, the origin Q2 is displaced by a distance $\Delta D12$, $\Delta D12$ may be subtracted from the value of the position on the uncorrected partial profile (drive command). In other words, for example, the position A in the local coordinate system Xb corresponds to a corrected value $Xb(A-\Delta D12)$. Here, $\Delta D12$, as described above, may be a positive or negative value. Therefore, subtracting $\Delta D12$ from the value of the position on the partial profile (drive command) means subtracting 2 from A if the value of $\Delta D12$ is +2, for example. However, if the value of $\Delta D12$ is −2, for example, 2 is to be added to A.

The drive command P2, $$[\{(Xb(301c),Xb(301d),v1,v1),(Xb(301d),Xb(301e),v1,v1),(Xb(301e),Xb(301f),v1,v0)\}] \quad (2)$$

before transmitted from the upper-level controller 104 to the lower-level controller 102b, is corrected by the upper-level controller with a drive command P2', $$[\{(Xb(301c-\Delta D12),Xb(301d-\Delta D12),v1,v1),(Xb(301d-\Delta D12),Xb(301e-\Delta D12),v1,v1),(Xb(301e-\Delta D2),Xb(301f-\Delta D12),v1,v0)\}] \quad (3)$$

and then is transmitted to the lower-level controller 102b. When the lower-level controller 102b receives the drive command P2', the lower-level controller 102b stores it in the memory 110b.

In the above, the example has been described in which a carriage is transported from one transporting module to an adjacent transporting module.

In a case where a control is performed to move a carriage through three or more transporting modules, differences in distance of two sensors across boundaries of adjacent transporting modules are added for the correction.

In a transport operation case where a carriage departs from the transporting module 101a, passes through the transporting module 101b and arrives at the transporting module 101c, a partial profile (drive command) P3 (not illustrated) is to be corrected in addition to the correct of the partial profile (drive command) P2. A difference $\Delta D23$ (not illustrated) from a designed value for a distance between the sensor 202bc and the 202ca is acquired.

Next, the true position R3a (not illustrated) of the sensor 202ca is acquired as $R3a=R3+\Delta D23$, the extraction and correction of the partial profile (drive command) may be performed in the manner as described above. In this case, because the sensor 202bc has a difference $\Delta D12$ as described above, the correction of the drive command subtracts $(\Delta D12+\Delta D23)$ from the positions. In other words, for example, a position A in the local coordinate system Xc corresponds to a corrected value $Xc(A-(\Delta D12+\Delta D23))$.

Application of the present disclosure to the entire transport system may require the measurements at boundaries of all transporting modules included in the transport path 100.

One of the methods for executing it includes sequentially stopping the carriage 105 at boundaries of all transporting modules, and performing the measurement thereon.

However, such measurements over the entire transport system by using one carriage 105 may take time, reducing the efficiency of transporting.

On the other hand, use of a scale, such as a scale of glass, having an individual difference in manufacturing and having a lower thermal expansion coefficient may make the individual difference of the carriage ignorable in most cases. Therefore, a plurality of carriages may be operated in parallel, and the measurement may be performed in parallel at boundaries of a plurality of transporting modules so that the time for the measurement at the boundaries of all transporting modules can be reduced.

Next, with reference to FIGS. 4A and 4B, a module drive command and a group transport command for transport a plurality of carriages 105a to 105c will be described.

Figure 4A:
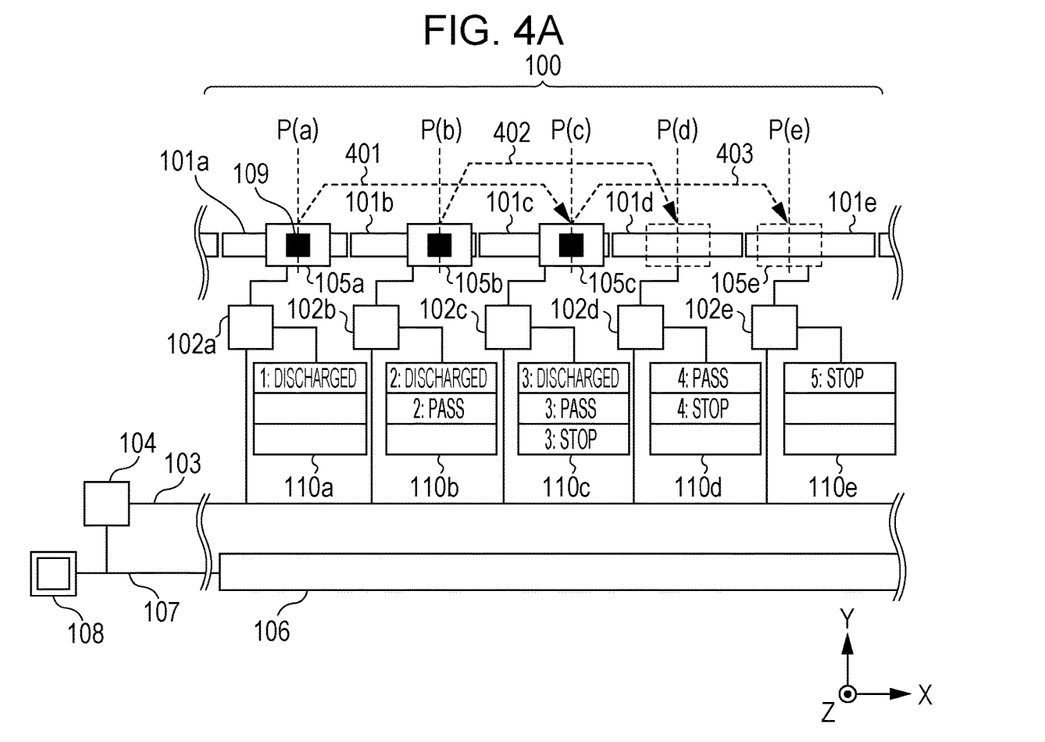
FIGS. 4A and 4B are transporting profiles regarding a plurality of carriages according to the first embodiment.

FIG. 4A illustrates a state that the carriages 105a to 105c first stop on the transporting modules 101a to 101c of the transporting modules 101a to 101e, like FIG. 1, and that no carriages exist on the transporting modules 101d and 101e.

After that, the lower-level controllers 102a to 102e transport the carriages 105a to 105c in response to a group transport command transmitted from the upper-level controller 104. Finally, the carriages 105a to 105c are transported to the transporting modules 101c to 101e and stop there.

Figure 4B:
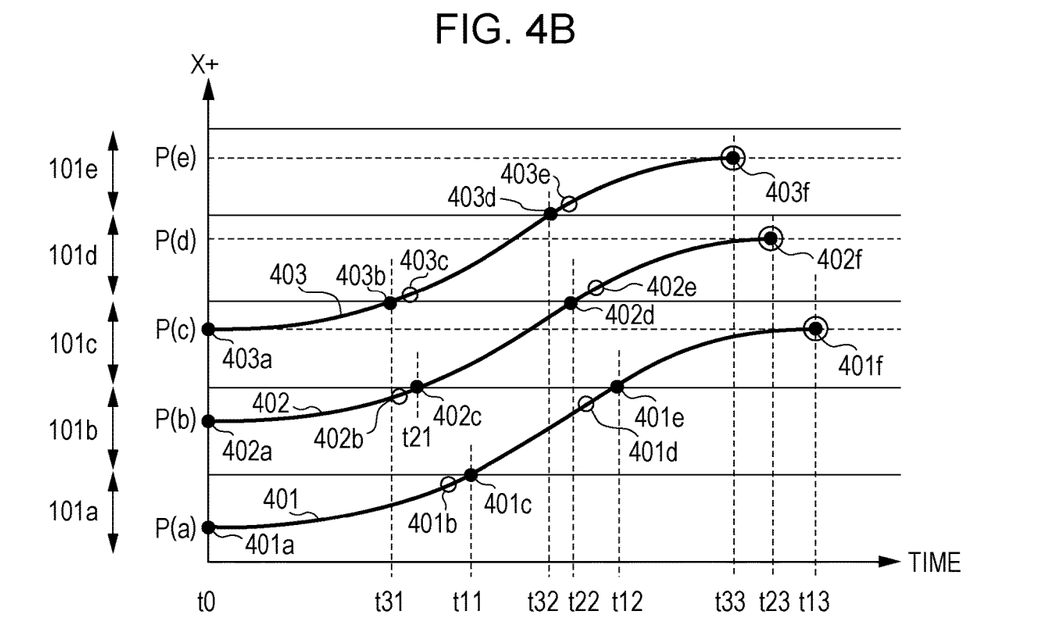

FIG. 4B illustrates transporting profiles 401 to 403 of the carriages 105a to 105c and has a vertical axis indicating time t and a horizontal axis indicating X positions of the carriages 105a to 105c. Referring to FIG. 4B, a time t0 is a time when a group transport command, which will be described below, is transmitted from the upper-level controller 104 to the lower-level controllers 102a to 102e for the transporting modules 101a to 101e.

A transporting profile 401 is a transporting profile in which the carriage 105a on the transporting module 101a is transported from a position P(a) to a position P(c) on the transporting module 101c. A transporting profile 402 is a transporting profile in which the carriage 105b on the transporting module 101b is transported from a position P(b) to a position P(d) on the transporting module 101d. A transporting profile 403 is a transporting profile in which the carriage 105c on the transporting module 101c is transported from a position P(c) to a position P(e) on the transporting module 101e.

In this case, a drive command to be transmitted to the lower-level controller 102a for the transporting module 101a is:

$$[\{(Xa(401a),Xa(401b),V(401a),V(401b)),(Xa(401b), Xa(401c),V(401b),V(401c))\}] \quad (4)$$

A drive command to be transmitted to the lower-level controller 102b for the transporting module 101b is:

$$[\{(Xb(402a-\Delta Db),Xb(402b-\Delta Db),V(402a),V(402b)), (Xb(402b),Xb(402c),V(402b),V(402c))\},\{(Xb(401c-\Delta Db),Xb(401d-\Delta Db),V(401c),V(401d)), (Xb(401d-\Delta Db),Xb(401e-\Delta Db),V(401d),V(401e))\}] \quad (5)$$

where $\Delta Db$ is a difference in distance (displaced amount) between the sensor close to the transporting module 101a of the transporting module 101b and the sensor close to the transporting module 101b of the transporting module 101a.

A drive command to be transmitted to the lower-level controller 102c for the transporting module 101c is:

$$[\{(Xc(403a-(\Delta Db+\Delta Dc)),Xc(403b-(\Delta Db+\Delta Dc)),V(403a),V(403b))\},\{(Xc(402c-(\Delta Db+\Delta Dc)),Xc(402d-(\Delta Db+\Delta Dc)),V(402c),V(402d))\},\{(Xc(401e-(\Delta Db+\Delta Dc)),Xc(401f-(\Delta Db+\Delta Dc)),V(401e),V(401f))\}] \quad (6)$$

where $\Delta Dc$ is a difference in distance (displaced amount) between the sensor close to the transporting module 101b of the transporting module 101c and the sensor close to the transporting module 101c of the transporting module 101b.

A drive command to be transmitted to the lower-level controller 102d for the transporting module 101d is:

$$[\{(Xd(403b-(\Delta Db+\Delta Dc+\Delta Dd)),Xc(403c-(\Delta Db+\Delta Dc+\Delta Dd)),V(403b),V(403c)),(Xd(403c-(\Delta Db+\Delta Dc+\Delta Dd)),Xb(403d-(\Delta Db+\Delta Dc+\Delta Dd)),V(403c),V(403d))\},\{(Xd(402d-(\Delta Db+\Delta Dc+\Delta Dd)),Xd(402e-(\Delta Db+\Delta Dc+\Delta Dd)),V(402d),V(402e))\}] \quad (7)$$

where $\Delta Dd$ is a difference in distance (displaced amount) between the sensor close to the transporting module 101c of the transporting module 101d and the sensor close to the transporting module 101d of the transporting module 101c.

A drive command to be transmitted to the lower-level controller 102e for the transporting module 101e is:

$$[\{(Xe(403d-(\Delta Db+\Delta Dc+\Delta Dd+\Delta De)),Xe(403e-(\Delta Db+\Delta Dc+\Delta Dd+\Delta De)),V(403d),V(403d)),(Xe(403e-(\Delta Db+\Delta Dc+\Delta Dd+\Delta De)),Xe(403f-(\Delta Db+\Delta Dc+\Delta Dd+\Delta De)),V(403e),V(403f))\}] \quad (8)$$

where $\Delta De$ is a difference in distance (displaced amount) between the sensor close to the transporting module 101e of the transporting module 101d and the sensor close to the transporting module 101d of the transporting module 101e.

These drive commands are stored within the memories 110a to 110e in the lower-level controllers 102a to 102e and, at the time t0, a group transport command is transmitted from the upper-level controller 104. Then, the lower-level controllers 102a to 102e performs driving control on the carriages 105a to 105c in response to the respective drive commands to transport the carriages 105a to 105c to target positions P(c), P(d), and P(e).

After that, the lower-level controller 102a transmits a driving completion signal to the upper-level controller 104 at a time t11 when all trapezoid driving profiles in the drive commands are processed. Also, the lower-level controller 102b, the lower-level controller 102c, the lower-level controller 102d, the lower-level controller 102e transmit their driving completion signals to the upper-level controller 104 at a time t12, a time t13, a time t32 and a time t33, respectively.

Here, referring to FIG. 1 and FIG. 4A, a "1:discharge" command is stored first in the memory 110a in the lower-level controller 102a, but the entity is the term in a brace in Expression (4). The memory 110b in the lower-level controller 102b stores "1:discharge" first and "2:pass" secondly, but their entities are the term in the first brace and the term in the second brace in Expression (5). The memory 110c in the lower-level controller 102c stores "1:discharge" first, "2:pass" secondly, "3:stop" thirdly, but their entities are terms in the first brace, the second brace and the third brace, respectively, in Expression (6). The memory 110d in the lower-level controller 102d stores "1:pass" first, and "2:stop" secondly, but their entities are terms in the first brace and the second brace in Expression (7). The memory 110e in the lower-level controller 102e stores "1:stop" first, and its entity is the term in a brace in Expression (8).

In this manner, module drive command transmitted to a certain lower-level controller of a plurality of lower-level controllers are a sequential alignment of trapezoid driving profiles of carriages on or entering to the transporting module corresponding to the certain lower-level controller. The trapezoid driving profile is a time-series alignment of trapezoid driving elements of carriages on or entering to the transporting module corresponding to the certain lower-level controller.

Figure 5:
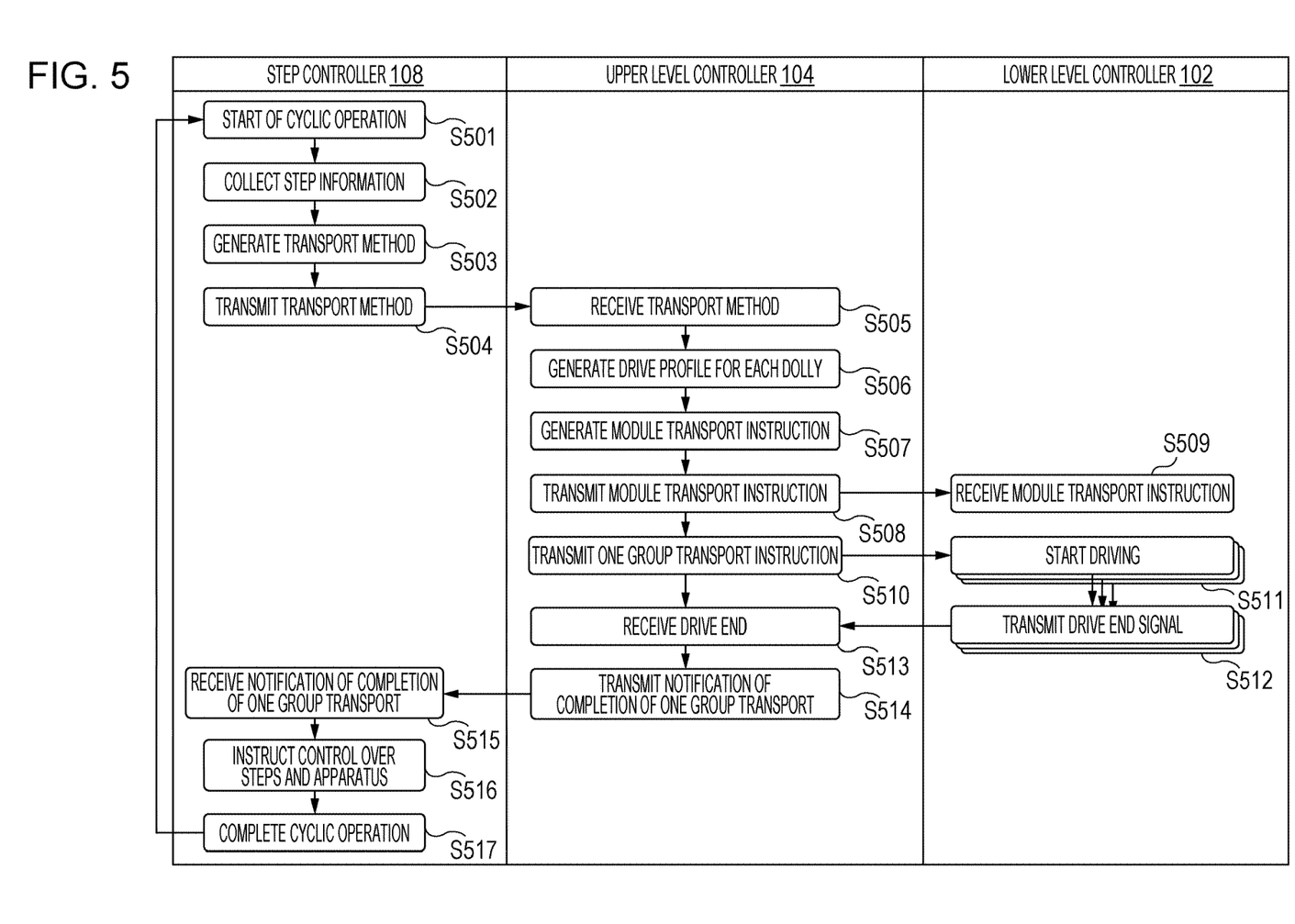
FIG. 5 is a flowchart illustrating cyclic operations according to the first embodiment.

FIG. 5 is a flowchart illustrating operations to be performed among the process control unit 108, the upper-level controller 104 and the lower-level controller 102.

Generally, in a manufacturing process for an industrial product, a plurality of work pieces 109 is transported on the transport path 100, and, at the same time, a plurality of processing device groups 106 aligned in the process order along the transport path 100 sequentially performs processing on the work pieces 109.

Here, a job unit of transporting and processing to be performed on work pieces 109 is called a "cyclic operation", and the cyclic operation is repeated to manufacture a product.

First, in step S502, the process control unit 108 collects process information regarding states of work pieces 109 and processing device groups 106 on the carriages 105. In step S503, the process control unit 108 generates a carriage transport method based on the collected process information. For example, in a case where there is a work piece on a carriage group including a plurality of carriages 105 that is not sufficiently processed, the work piece may be transported to a process which additionally perform processing or may be transported to a process for the purpose of collection. For that, the transport method for the carriages 105 is reviewed every cyclic operation. In step S504, the process control unit 108 transmits the transport method for a carriage group including a plurality of carriages 105 to the upper-level controller 104.

In step S505, the upper-level controller 104 receives the transport method for the carriage group. In step S506, the upper-level controller 104 generates a trapezoid driving profile for each of the carriages 105 based on the transport method for the carriage group. In step S507, the upper-level controller 104 divides driving profiles for carriages module by module and generates a drive command. In this case, the drive command is corrected based on a distance between transporting modules (distance between sensors). In step S508, the upper-level controller 104 transmits the corrected drive command having trapezoid driving profiles to the lower-level controllers 102.

In step S509, the lower-level controllers 102 receive the drive command and store them in memory. The lower-level controllers 102 wait for a group transport command from the upper-level controller 104. In step S510, the upper-level controller 104 transmits a group transport command to the lower-level controllers 102. In step S511, the lower-level controllers 102 receive the group transport command and simultaneously start a driving control over their corresponding carriages. The lower-level controllers 102 may start transporting of the carriage 105 on their corresponding transporting module 101 or apply the trapezoid driving profile on the carriage 105 entering thereto to transport or stop the carriage 105.

In step S512, the lower-level controllers 102 complete the application of the all trapezoid driving profiles for the drive commands transmitted from the upper-level controller 104 and then transmit driving completion signals to the upper-level controller 104. When the upper-level controller 104 receives the driving completion signals from the lower-level controllers 102 in step S513, the upper-level controller 104 notifies the completion of the group transport to the process control unit 108 in step S514.

In step S515, the process control unit 108 receives the notification of the group transport from the upper-level controller 104. In step S516, the process control unit 108 transmits a control command to the corresponding processing devices in the processing device group 106 to cause them to perform processing on the work pieces 109. Then, the one cyclic operation completes (S517). After one cyclic operation completes, the process control unit 108 starts the next cyclic operation (S501 to S517).

Correcting drive commands in this manner can prevent vibrations or detection of different carriage positions due to conflict of electric current controls by control units configured to control corresponding two adjacent transporting modules.

Although the upper-level controller 104 corrects a partial profile (drive command) according to this embodiment and transmits the corrected ones to the lower-level controllers 102, embodiments are not limited thereto.

For example, the upper-level controller 104 may acquire a difference ΔD12 from a designed value D0 in distance between transporting modules, and the value may be transmitted to the lower-level controllers 102. The lower-level controllers 102 may hold the value.

Other lower-level controllers also may measure and hold a displaced amount in distance between the transporting modules.

After that, the upper-level controller transmits the partial profile (drive command) that is not corrected to the lower-level controllers and instructs to start transport.

Each of the lower-level controllers corrects the received partial profile (drive command) by using the stored displaced amount and perform electric current control.

Although the carriage 105 is driven by electromagnetic force generated between the carriage 105 and the coil group 203 attached to the module case 201 according to this embodiment and is transported along the transport path 100 (X axis), embodiments are not limited thereto. The module housing 201 may contain a permanent magnet, and the carriage 105 may contain a coil, if the carriage can be driven along a rail.

According to the aforementioned embodiments, the transport path 100 is physically divided into a plurality of transporting modules, and each of the transporting modules corresponds to a control zone.

However, the application scope of the present disclosure is not limited to a transport system with such a configuration. For example, a plurality of coil groups may be installed in one long module housing, each of the plurality of coil groups corresponds to a control zone.

According to the aforementioned embodiment, the carriage 105 is stopped at a position across adjacent sensors, and then the measurement is performed thereon. Stopping the carriage 105 in the middle of the transport path 100 may reduce efficiency of transport operations by the entire transport system even for a short time period, which means frequently stopping the carriage 105 is not desirable.

On the other hand, immediately after the transport system starts operating, different intervals between transporting modules may occur mainly due to heat expansion. Accordingly, the measurement may be repeated immediately after the start of the operation of the transport system.

How the measurement is to be performed without stopping the carriage 105 will be described below with reference to FIGS. 3A, 3B, and 3C.

An example will be described in which a distance between the sensors 202ac and 202ba is measured while the carriage 105 is passing by a boundary of the transporting modules 101a and 101b.

When the carriage 105 faces both of the sensors 202ac and 202ba, the upper-level controller 104 simultaneously instructs the lower-level controller 102a to read out position information by the sensor 202*ac* and instructs the lower-level controller 102*b* to read out position information by the sensor 202*ba*.

A difference between position information acquired by reading out one scale 206 by the two sensors 202*ac* and 202*ba* so that the aforementioned measurement relating to the transporting modules 101*a* and 101*b* can be achieved as in the aforementioned embodiment.

The measurement method as described above does not consider a difference in communication time between the upper-level controller 104 and the lower-level controllers 102*a* and 102*b*. Therefore, this method may only be applicable when the carriage 105 has a sufficiently low velocity and when lower accuracy is requested for the transporting.

A method for solving a problem caused by the difference in communication time will be describe.

Each of the lower-level controller 102*a* and 102*b* internally contains a clock (not illustrated). The contained clocks are synchronized by a publicly known method which synchronizes clocks contained in a plurality of computers connected to a communication system.

When the carriage 105 reaches a boundary of the transporting modules 101*a* and 101 *b*, the upper-level controller 104 simultaneously instructs the lower-level controller 102*a* to read out position information for a predetermined time period by the sensor 202*ac* and instructs the lower-level controller 102*b* to read out position information for the predetermined time period by the sensor 202*ba*.

Each of the lower-level controller 102*a* and 102*b* holds the position information for the predetermined time period with time stamps in a position table (not illustrated).

The predetermined time period may be equal to a communication delay time of the used communication system, and generally, several milliseconds are enough.

After a time period equal to or longer than the predetermined time period passes, the upper-level controller 104 calculates position information of the parts with a matched time stamp value with reference to the position tables of the lower-level controllers 102*a* and 102*b*. Thus, the same measurement relating to the transporting modules 101*a* and 101*b* can be performed like the aforementioned embodiment.

Here, the synchronized clocks contained in the lower-level controller 102*a* and 102*b* may gradually be asynchronized, which is to be avoided.

There is a commercially available technology called a distribute clock which can solve the two problems, that is, the communication delay time and asynchronization of the contained clocks.

Assume that the upper-level controller 104 and the lower-level controllers 102*a* and 102*b* are connected by a communication system called EtherCAT (registered trademark) including the distribute clock function where the upper-level controller 104 is set as a master, and the lower-level controllers 102*a* and 102*b* are set as slaves.

In the thus configured transport system, as described above, the upper-level controller 104 simultaneously instructs the lower-level controller 102*a* to read out position information by the sensor 202*ac* and instructs the lower-level controller 102*b* to read out position information by the sensor 202*ba*.

Unlike the case in the above, as a result of signal transmission in consideration of the communication delay time by the communication system, the two position information pieces of the scale 106 simultaneously read out by the lower-level controllers 102*a* and 102*b* can be obtained.

The upper-level controller 104 calculates a difference between the two position information pieces. Thus, the measurement can be performed with high accuracy for the transporting modules 101*a* and 101*b*.

Second Embodiment

Figure 6:
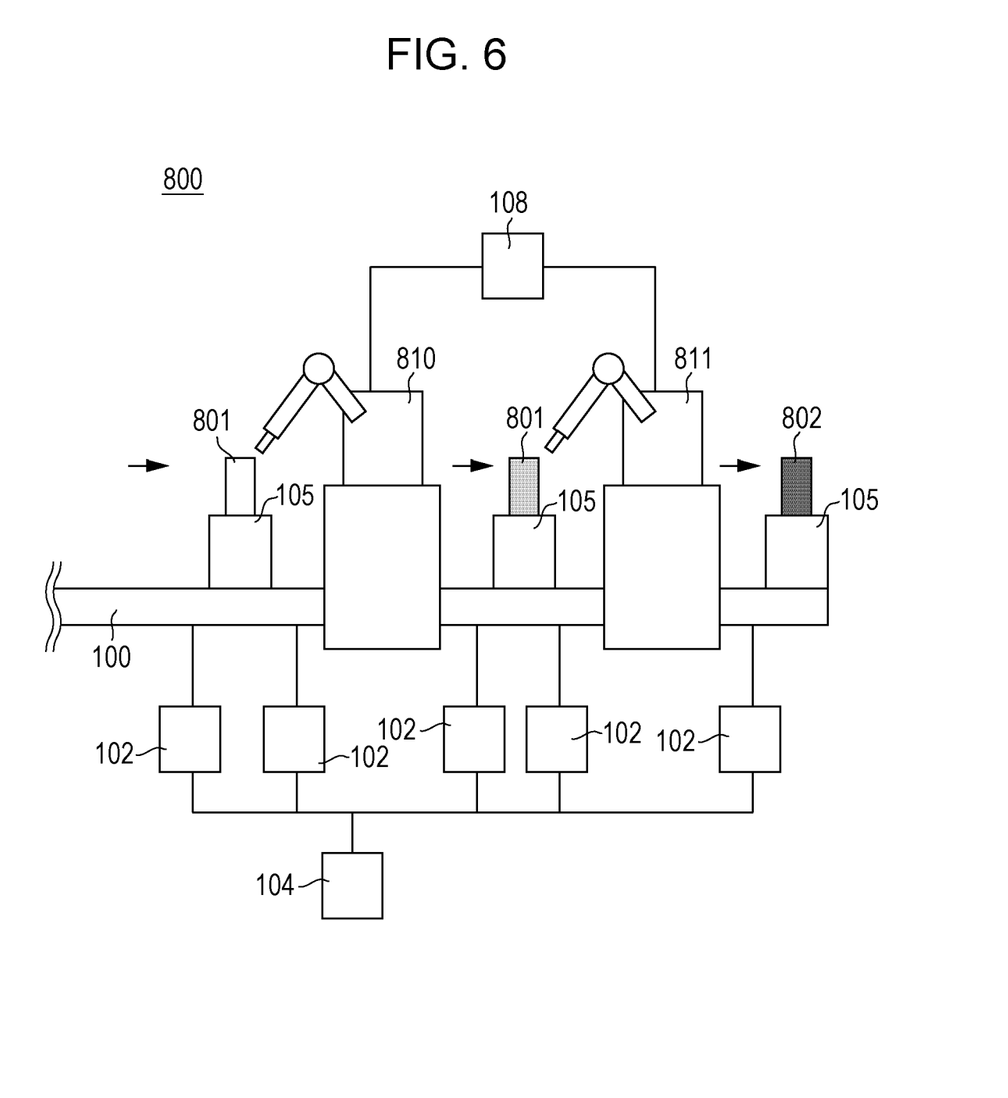
FIG. 6 is a schematic configuration diagram illustrating a manufacturing system according to a second embodiment.

An article manufacturing system 800 according to a second embodiment of the present disclosure will be described with reference to FIG. 6. The article manufacturing system 800 includes the carriage transport system 1 and processing devices 810 and 811 according to the first or second embodiment, and the carriage transport system 1 is configured to transport a work piece 801 between the processing devices 810 and 811. Here, the term "article" refers to a toner cartridge for an ink-jet printer or a copying machine, a part for a camera, a semiconductor product, for example. The number of the processing devices 810 and 811 is not limited thereto.

An article manufacturing method by the manufacturing system 800 will be described. The upper-level controller 104 simultaneously transmits a group transport command to a plurality of lower-level controllers 102, and the lower-level controllers 102 receive the group transport command. In response thereto, each of the lower-level controllers 102 applies the drive command, which has been received in advance from the upper-level controller 104, to the carriage 105 on or entering to the corresponding transporting module and thus transports the carriage 105 toward the first and second processing devices 810 and 811. The work piece 801 is held on the carriage 105, and the processing devices 810 and 811 receiving the transported carriage 105 perform predetermined processes on the work piece 801.

For example, in a case where an article to be manufactured is an ink-jet printer toner cartridge, the work piece 801 is a cartridge into which toner powder is put. The processing device 810 then performs a process for putting toner powder for polychrome inks into the work piece 801, and the processing device 811 performs a process for putting toner powder for a black ink into the work piece 801. Finally, an ink cartridge product is manufactured as an article 802.

The article manufacturing system according to this embodiment can manufacture an article with advantages of the transport system according to the first and second embodiments. This, as a result, can contribute to enhanced efficiency of manufacturing of the article and reduction of the manufacturing costs.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-230997 filed Nov. 30, 2017 and No. 2018-207506 filed Nov. 2, 2018, which are hereby incorporated by reference herein in their entirety.

What is claimed is:

1. A transport system comprising:
    a transport path including a plurality of transporting modules, wherein the plurality of transporting modules includes at least a first transporting module and a second transporting module, and the first transporting module is positioned upstream of the second transporting module;
    a carriage configured to move on the transport path;
    a first controller configured to control a position and/or a speed of the carriage;
    a first sensor provided on one of the first transporting module and the second transporting module; and
    a reference portion provided on another one of the first transporting module and the second transporting module,
    wherein the first controller controls the position and/or the speed of the carriage based on a distance between the first sensor and the reference portion.

2. The transport system according to claim 1,
    wherein the carriage has a plurality of permanent magnets,
    wherein the first transporting module includes a first coil group that is disposed at a first position opposable to the plurality of permanent magnets,
    wherein the second transporting module includes a second coil group that is disposed at a second position opposable to the plurality of permanent magnets, and
    wherein the first controller is configured to control an amount of current to be fed to the first coil group and the second coil group.

3. The transport system according to claim 1, wherein the reference portion includes both an expected position of a sensor and a position at which the sensor is present.

4. The transport system according to claim 3, wherein (i) the first controller is an upper-level controller, (ii) a first value R1 is a first designed value indicating an expected position of the first sensor on a global coordinate system and is held in the upper-level controller, (iii) an actual position of the first sensor is an origin of the first transporting module, (iv) the reference portion is a second sensor provided on the second transporting module, (v) a second value R2 is a second designed value indicating an expected position of the second sensor on the global coordinate system and is held in the upper-level controller, and (vi) the expected position of the second sensor is an origin of the second transporting module.

5. The transport system according to claim 1, wherein the second transporting module is adjacent to the first transporting module.

6. The transport system according to claim 5,
    wherein the reference portion is a second sensor provided on the second transporting module,
    wherein the plurality of transporting modules includes a third transporting module that is adjacent to the second transporting module,
    wherein the transport system further includes a third sensor provided on the third transporting module, and
    wherein the first controller controls the position and/or the speed of the carriage based on the distance between the first sensor and the second sensor and a second distance between the second sensor and the third sensor.

7. The transport system according to claim 1,
    wherein the first sensor is provided on the first transporting module, and
    wherein the reference portion is a second sensor provided on the second transporting module.

8. The transport system according to claim 7, wherein the distance between the first sensor and the second sensor is a value acquired based on a first detection value detected by the first sensor and a second detection value detected by the second sensor.

9. The transport system according to claim 7, wherein the distance between the first sensor and the second sensor is longer than a length in a moving direction of the carriage.

10. The transport system according to claim 7,
    wherein the first transporting module includes a third sensor,
    wherein the second transporting module includes a fourth sensor,
    wherein the first sensor is disposed at a position closer to the second transporting module than the third sensor, and
    wherein the second sensor is disposed at a position closer to the first transporting module than the fourth sensor.

11. The transport system according to claim 7, wherein the first controller includes a drive command configured to control the position and/or the speed of the carriage, and the drive command is determined based on the distance between the first sensor and the second sensor.

12. The transport system according to claim 11, further comprising a second controller configured to control the first controller,
    wherein the drive command is transmitted from the second controller to the first controller.

13. The transport system according to claim 11, wherein the drive command includes a position represented on a coordinate system set for each of the first transporting module and the second transporting module.

14. A method for a transport system having a transport path, a carriage, a first controller, a first sensor provided on one of the first transporting module and the second transporting module, and a reference portion provided on another one of the first transporting module and the second transporting module, wherein the transport path includes a plurality of transporting modules, wherein the plurality of transporting modules includes at least a first transporting module and a second transporting module, and the first transporting module is positioned upstream of the second transporting module, the method comprising:
    moving the carriage on the transport path; and controlling, via the first controller a position and/or a speed of the carriage based on a distance between the first sensor and the reference portion.

15. A transport method for a carriage, the transport method comprising:
moving the carriage along a first transporting module in response to a first drive command;
moving the carriage across the first transporting module and a second transporting module in response to the first drive command and a second drive command, wherein the first transporting module is positioned upstream of the second transporting module; and
moving the carriage along the second transporting module in response to the second drive command,
wherein the second drive command is determined based on a distance between a first sensor provided on one of the first transporting module and the second transporting module and a reference portion provided on another one of the first transporting module and the second transporting module.

16. The transport method according to claim 15,
wherein the first sensor is provided on the first transporting module,
wherein the reference portion is a second sensor provided on the second transporting module, and
wherein the distance between the first sensor and the second sensor is a value acquired based on a first detection value detected by the first sensor and a second detection value detected by the second sensor.

17. An article manufacturing method using the transport system according to claim 1 and at least one processing device, the article manufacturing method comprising:
transporting the carriage by the transport system to the at least one processing device; and
manufacturing an article by performing a predetermined process on a work piece on the carriage by the at least one processing device.

* * * * *